United States Patent
Anderegg et al.

(10) Patent No.: US 11,628,374 B2
(45) Date of Patent: Apr. 18, 2023

(54) VIRTUAL PUPPETEERING USING A PORTABLE DEVICE

(71) Applicants: Disney Enterprises, Inc., Burbank, CA (US); ETH Zurich, Zurich (CH)

(72) Inventors: Raphael Anderegg, Zurich (CH); Loic Ciccone, Zurich (CH); Robert W. Sumner, Zurich (CH)

(73) Assignees: Disney Enterprises, Inc., Burbank, CA (US); ETH Zürich, Zurich (CH)

( * ) Notice: Subject to any disclaimer, the term of this patent is extended or adjusted under 35 U.S.C. 154(b) by 224 days.

(21) Appl. No.: 16/917,467

(22) Filed: Jun. 30, 2020

(65) Prior Publication Data

US 2021/0008461 A1 Jan. 14, 2021

Related U.S. Application Data

(60) Provisional application No. 62/873,021, filed on Jul. 11, 2019.

(51) Int. Cl.
*A63H 3/36* (2006.01)
*A63J 19/00* (2006.01)
(Continued)

(52) U.S. Cl.
CPC ............ *A63H 3/36* (2013.01); *A63J 19/006* (2013.01); *G06T 13/20* (2013.01); *G06T 13/40* (2013.01);
(Continued)

(58) Field of Classification Search
CPC ........ A63H 3/36; A63H 2200/00; A63H 3/00; A63J 19/006; G06T 13/20; G06T 13/40;
(Continued)

(56) References Cited

U.S. PATENT DOCUMENTS

2012/0086729 A1\* 4/2012 Baseley ................ G06T 19/006
 345/633
2014/0152758 A1\* 6/2014 Tong ....................... G06T 13/40
 348/14.02
(Continued)

OTHER PUBLICATIONS

Park, Byung-Hwa, and Se-Young Oh. "ARgo: animate everyday object in augmented reality." Proceedings of the 11th Conference on Advances in Computer Entertainment Technology. 2014. (Year: 2014).\*

(Continued)

*Primary Examiner* — Daniel F Hajnik
(74) *Attorney, Agent, or Firm* — Farjami & Farjami LLP

(57) ABSTRACT

A virtual puppeteering system includes a portable device including a camera, a display, a hardware processor, and a system memory storing an object animation software code. The hardware processor is configured to execute the object animation software code to, using the camera, generate an image in response to receiving an activation input, using the display, display the image, and receive a selection input selecting an object shown in the image. The hardware processor is further configured to execute the object animation software code to determine a distance separating the selected object from the portable device, receive an animation input, identify, based on the selected object and the received animation input, a movement for animating the selected object, generate an animation of the selected object using the determined distance and the identified movement, and render the animation of the selected object.

18 Claims, 9 Drawing Sheets

(51) Int. Cl.
*G06T 13/80* (2011.01)
*G06T 13/40* (2011.01)
*G06T 13/20* (2011.01)

(52) U.S. Cl.
CPC .......... *G06T 13/80* (2013.01); *G06T 2200/24* (2013.01); *G06T 2215/16* (2013.01)

(58) Field of Classification Search
CPC . G06T 13/80; G06T 2200/24; G06T 2215/16; G06T 13/205; A63F 13/26; A63F 13/56; A63F 13/655; G06F 2200/1637; G10L 17/26; G10L 21/10
See application file for complete search history.

(56) References Cited

U.S. PATENT DOCUMENTS

| | | | | |
|---|---|---|---|---|
| 2014/0191102 | A1* | 7/2014 | Lin | F16M 13/022 248/454 |
| 2015/0356788 | A1* | 12/2015 | Abe | A63F 13/335 345/633 |
| 2018/0260931 | A1* | 9/2018 | Ozguner | G06F 12/0897 |

OTHER PUBLICATIONS

Hebborn, Anna Katharina, Nils Höhner, and Stefan Müller. "Occlusion matting: realistic occlusion handling for augmented reality applications." 2017 IEEE International Symposium on Mixed and Augmented Reality (ISMAR). IEEE, 2017. (Year: 2017).*
Pao, Jennie. "Designing an audio-based mobile virtual pet game application." Graduate School of Media Design, Keio University—Master Thesis, pp. 12-14 (2012). (Year: 2012).*
Video Titled "My real life pet Dragon! (Supercool Augmented Reality iPhone game!)", published Sep. 23, 2017; available for viewing at: https://www.youtube.com/watch?v=eQ2ycajAmzk; select screenshots included. (Year: 2017).*
Pollmann, Frederic, et al. "Evaluation of interaction methods for a real-time augmented reality game." International Conference on Entertainment Computing. Springer, Berlin, Heidelberg, 2013. (Year: 2013).*
"Accelerometer-based User Interfaces for the Control of a Physically Simulated Character" by Takaaki Shiratori and Jessica K. Hodgins. (ACM 2008).
"Performance Animation from Low-dimensional Control Signals" by Jinxiang Chai and Jessica K. Hodgins. (ACM 2005).
"Deep Motifs and Motion Signatures" by Aristidou et al. (ACM 2018).
"Finger Walking: Motion Editing with Contact-based Hand Performance" by Noah Lockwood and Karan Singh. (ACM 2012).
"Generalized Biped Walking Control" by Stelian Coros, Philippe Beaudoin, and Michiel van de Panne. (ACM 2010).
"Gestural Motion Editing Using Mobile Devices" by Noah Lockwood and Karan Singh. (ICMG 2016).
"Interactive Generation of Human Animation with Deformable Motion Models" by Jianyuan Min et al. (ACM 2009).
"Interactive Control of Avatars Animated with Human Motion Data" by Lee et al. (ACCGIT 2002).
"Layered Acting for Character Animation" by Dontcheva et al. (ACM 2003).
"Layered Performance Animation with Correlation Maps" by Neff et al. (Comput. Graph. Forum 2007).
"MobiSweep: Exploring Spatial Design Ideation Using a Smartphone As a Hand-held Reference Plane" by Vinayak et al. (TEI 2016).
"Motion capture and activity tracking using smartphone-driven body sensor networks" by Pascu et al. (INTECH 2013).
"Motion Graphs++: A Compact Generative Model for Semantic Motion Analysis and Synthesis" by Jianvuan Min and Jinxiang Chai. (ACM 2012).
"Motion Reconstruction Using Sparse Accelerometer Data" by Tautges et al. (ACM 2011).
"MotionBeam: A metaphor for character interaction with handheld projectors" Willis et al. (CHFCS 2011).
"Flexible Muscle-Based Locomotion for Bipedal Creatures" by Geijtenbeek et al. (ACM 2013).
"On Natural Motion Processing using Inertial Motion Capture and Deep Learning" by John H. Geissinger. (VPISU 2020).
"PuppetPhone: Puppeteering Virtual Characters Using a Smartphone" by Anderegg et al. (ACM 2018).
"Pushing People Around" by Arikan et al. (ACM 2005).
"Realtime Performance Animation Using Sparse 3D Motion Sensors" by Kim et al. (Motion in Games 2012).
"Realtime Human Motion Control with a Small Number of Inertial Sensors" by Liu et al. (SI3DGG 2011).
"Sampling-based Contact-rich Motion Control" by Liu et al. (ACM 2010).
"SIMBICON: Simple Biped Locomotion Control" by Yin et al. (ACM 2007).
"Simple Data-driven Control for Simulated Bipeds" by Geijtenbeek et al. (ACM 2012).
"Motion Doodles: An Interface for Sketching Character Motion" by Thorne et al. (ACM 2004).

* cited by examiner

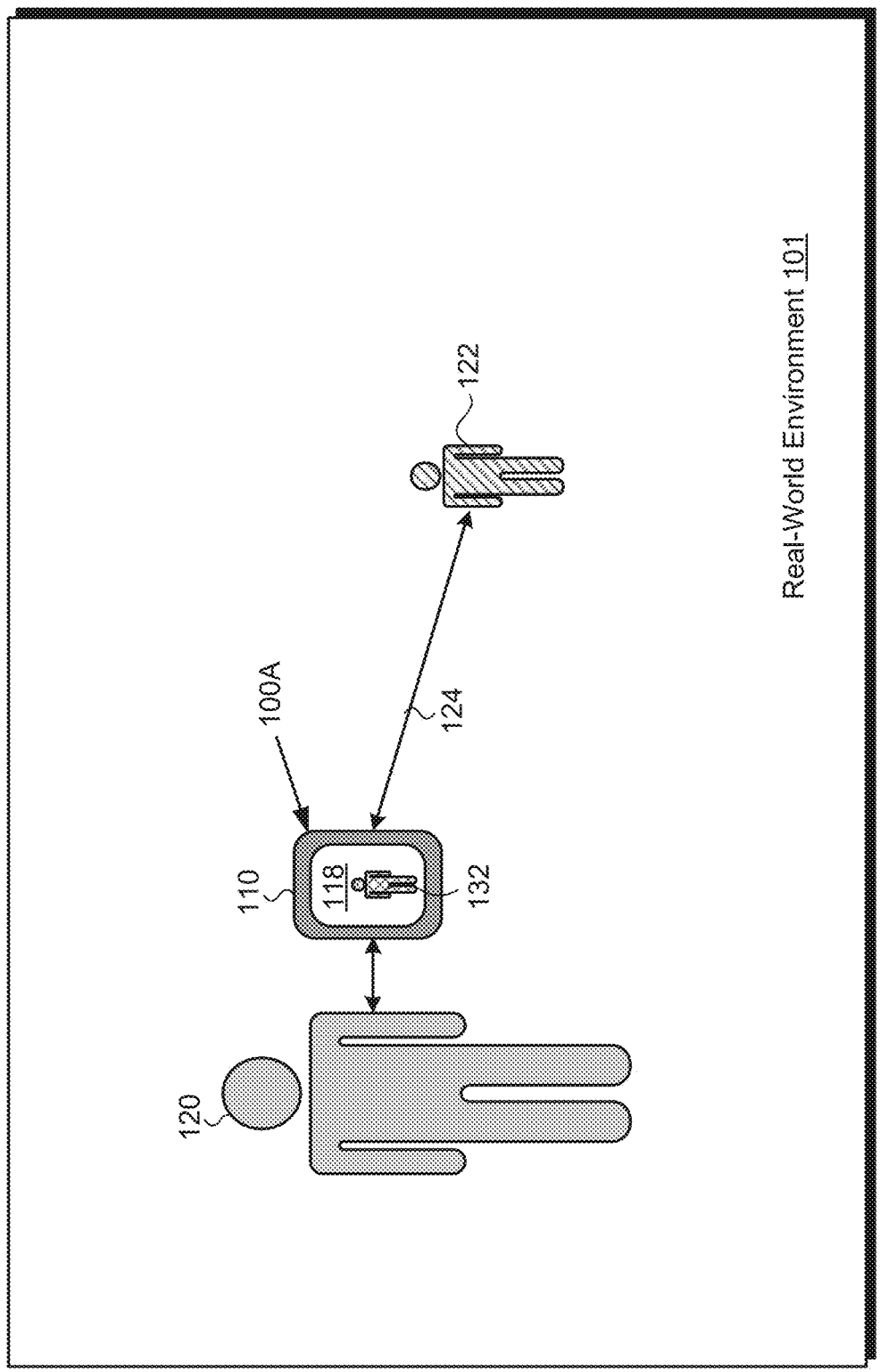

VIRTUAL PUPPETEERING USING A PORTABLE DEVICE

RELATED APPLICATION(S)

The present application claims the benefit of and priority to U.S. Provisional Patent Application Ser. No. 62/873,021, filed Jul. 11, 2019, and titled "Puppeteering Virtual Characters Using a Portable Device," which is hereby incorporated fully by reference into the present application.

BACKGROUND

When playing with a traditional toy, such as a doll or an action figure, for example, a core play pattern is to grasp the toy and move it around. While doing this, children imagine the character represented by the toy to be walking around in a room, interacting with objects, and even participating in stories or engaging in quests. A physical doll, however, being inanimate, merely follows the child's gestures in an inert and non-interactive way.

In video games, by contrast, virtual characters can move in exciting, apparently interactive ways. However, that appearance of interaction is indirect due to the lack of physical engagement with the virtual characters. Moreover, because children typically control virtual characters using buttons on a controller or moving a joystick, the direct one-to-one interaction with a traditional toy is unfortunately lost. For instance, even sophisticated video games that use motion tracking do not provide a one-to-one interaction, but rather tend to use the tracking as a means of controlling the virtual character.

SUMMARY

There are provided systems and methods for performing virtual puppeteering using a portable device, substantially as shown in and/or described in connection with at least one of the figures, and as set forth more completely in the claims.

BRIEF DESCRIPTION OF THE DRAWINGS

FIG. 1A shows a diagram of an exemplary virtual puppeteering system, according to one implementation;

DETAILED DESCRIPTION

Figure 1B:
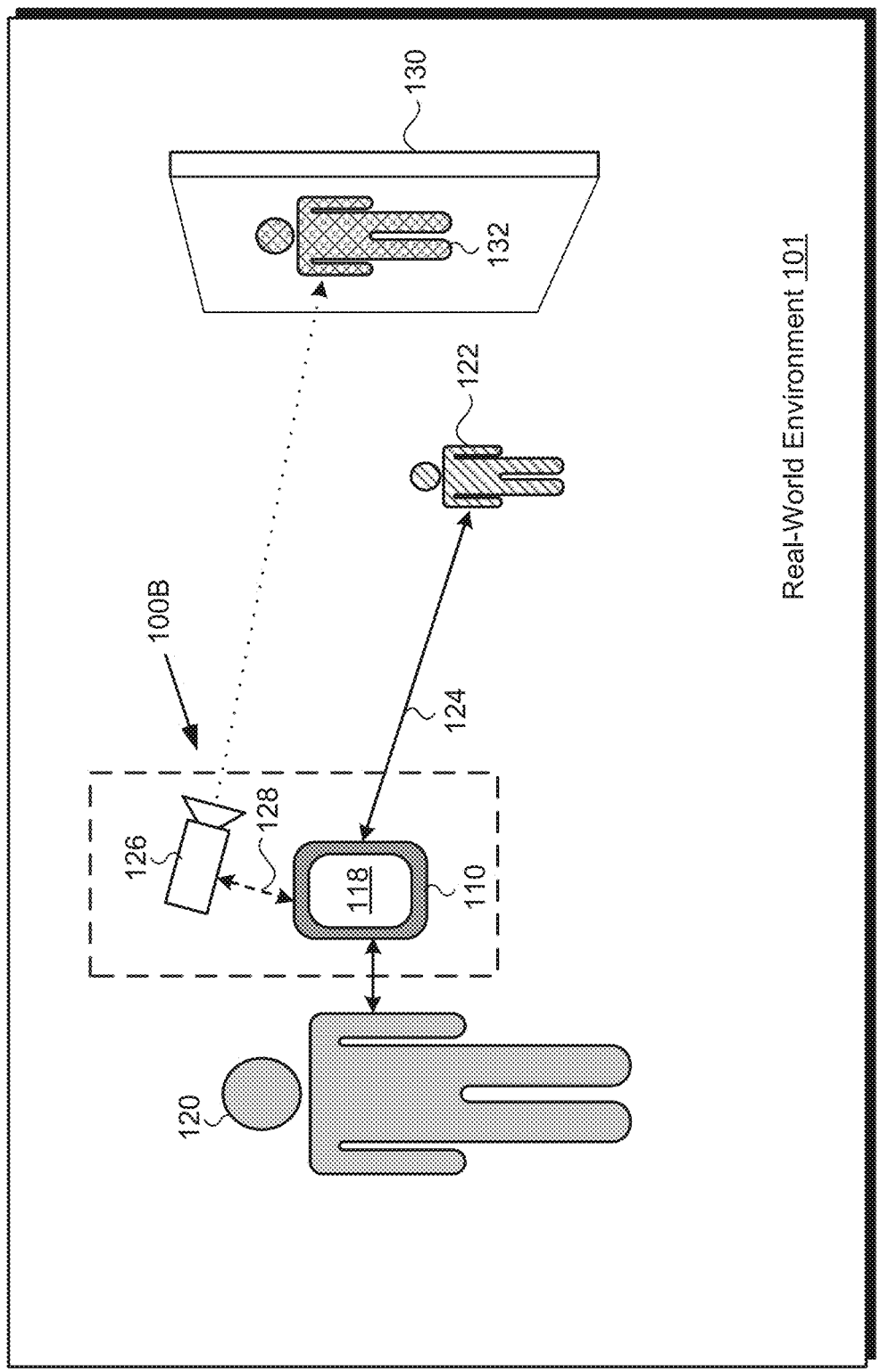
FIG. 1B shows a diagram of an exemplary virtual puppeteering system, according to another implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, when playing with a traditional toy, such as a doll or an action figure, for example, a core play pattern is to grasp the toy and move it around, while imagining that the character represented by the toy is walking around in a room, interacting with objects, and even participating in stories or engaging in quests. Nevertheless, a physical doll, being inanimate, merely follows the child's gestures in an inert and non-interactive way. As also noted above, although virtual characters (e.g., video game characters) can move in exciting, apparently interactive ways, that appearance of interaction is indirect. Moreover, because children typically control virtual characters using buttons on a controller or moving a joystick, the direct one-to-one physical interaction with a traditional toy is unfortunately lost. Even sophisticated video games that use motion tracking do not provide a one-to-one interaction, but rather tend to use the tracking as a means of controlling the virtual character.

The present application discloses virtual puppeteering systems and methods that overcome the drawbacks and deficiencies in the conventional art. The present disclosure introduces a novel interaction that brings the traditional experience of holding and manipulating a doll to the digital world, allowing children to virtually hold and move virtual characters that depict real-world physical toys or other physical objects. The present disclosure combines advantages of both real and virtual worlds by providing a tangible motion interface, similar to the manipulation of physical toys, while augmenting the virtual character's movement with animations similar to those of a video game character.

FIG. 1A shows a diagram of exemplary virtual puppeteering system 100A, according to one implementation. As shown in FIG. 1A, virtual puppeteering system 100A includes portable device 110 having display screen 118, which, in some implementations, may be a touchscreen, for example. As further shown in FIG. 1A, virtual puppeteering system 100A is implemented within real-world environment 101 including one or more real-world objects or structures, represented in FIG. 1A by object 122 in the form of an exemplary toy (e.g., doll, figurine, or action figure) separated from portable device 110 by distance 124. Also shown in FIG. 1A is user 120 of portable device 110, who may be a child or an adult utilizing portable device 110 to animate a virtual character depicting object 122, and to interact with the animation.

According to the exemplary implementation shown in FIG. 1A, portable device 110 may be a handheld device, such as a smartphone or tablet computer, for example. Alternatively, portable device 110 may take the form of a digital media player, a game console, a laptop computer, or a wearable device, such as a smartwatch, for example. According to the exemplary implementation shown in FIG. 1A, portable device 110 is configured to render animation 132 of object 122 on display screen 118 of portable device 110. In various implementations, display screen 118 of portable device 110 may be a liquid crystal display (LCD), a light-emitting diode (LED) display, an organic light-emitting diode (OLED) display, or a display screen implemented using any other suitable display technology that performs a physical transformation of signals to light.

In some implementations, real-world environment 101 may take the form of an indoor venue. Such indoor venues may include a personal residence, a school, or a film or broadcast studio, to name a few examples. Alternatively, in some implementations, real-world environment 101 may be an outdoor environment. Examples of an outdoor environment may include a residential yard, a playground, or a park, such as a theme park, to name a few. It is noted that although FIG. 1A explicitly shows real-world environment 101 to include only object 122, that simplified representation is provided merely for conceptual clarity. More generally, real-world environment 101 may include multiple structures, such as walls, a ceiling, a floor, and one or more objects other than object 122, such as articles of furniture and art or decorative objects to name a few examples.

FIG. 1B shows a diagram of exemplary virtual puppeteering system 100B, according to another implementation. It is noted that virtual puppeteering system 100B, in FIG. 1B, corresponds in general to virtual puppeteering system 100A, in FIG. 1A, and may share any of the characteristics attributed to that corresponding system by the present disclosure. It is further noted that any feature in FIG. 1B identified by a reference number identical to a reference number appearing in FIG. 1A corresponds to that previously described feature and may share any of the characteristics attributed to it above.

According to the exemplary implementation shown in FIG. 1B, and in contrast to the implementation shown in FIG. 1A, virtual puppeteering system 100B includes projection device 126 communicatively coupled to portable device 110 by communication link 128, which may be a wired or wireless communication link. As further shown in FIG. 1B, according to the present exemplary implementation, portable device 110 is configured to control projection device 126 to render animation 132 of object 122 by projecting animation 132 onto real-world surface 130 in real-world environment 101.

It is noted that although FIG. 1B depicts surface 130 as a wall surface in real-world environment 101, that representation is merely exemplary. In other implementations in which real-world environment 101 is an indoor venue, surface 130 may be a furniture surface (e.g., tabletop or desktop surface), a floor surface, a ceiling surface, or any other suitable surface in real-world environment 101 for rendering animation 132 of object 122. In implementations in which real-world environment 101 is an outdoor environment, surface 130 may be a projection screen, a picnic tabletop, or a benchtop, to name a few examples.

Projection device 126 may include one or more projectors, such as a stand-alone wide-field projection system, a fisheye lens projector, or multiple stitched projection-mapped video projectors. In some implementations, projection device 126 may be configured to render animation 132 of object 122 as a two-dimensional (2D) animation. However, in other implementations, projection device 126 may be configured to render animation 132 as a three-dimensional (3D) animation. For example, projection device 126 may take the form of a 3D projection system, or a 2D display configured to spin so as to generate an apparently 3D image.

Figure 1C:
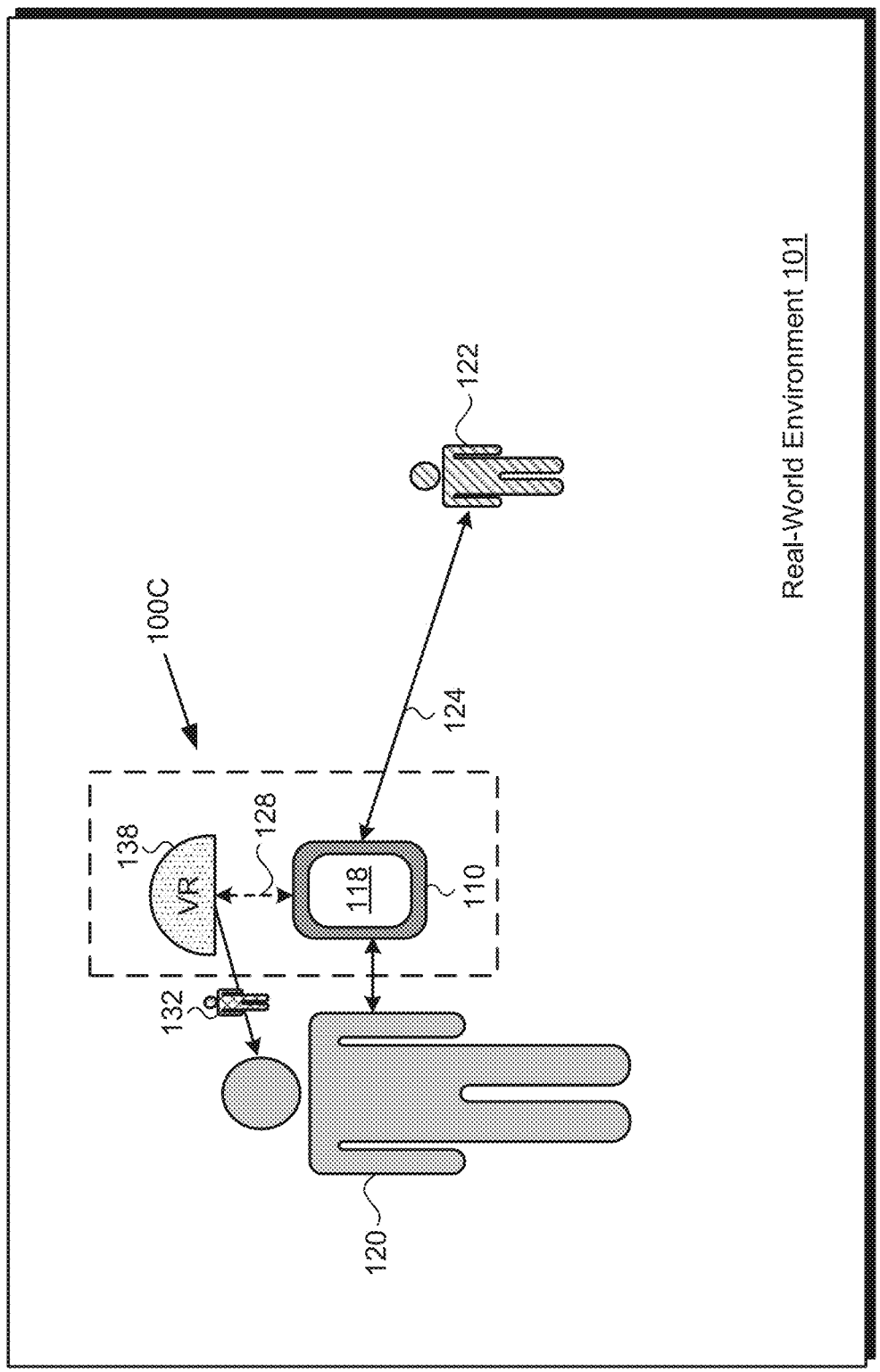
FIG. 1C shows a diagram of an exemplary virtual puppeteering system, according to yet another implementation.

FIG. 1C shows a diagram of exemplary virtual puppeteering system 100C, according to yet another implementation. It is noted that virtual puppeteering system 100C, in FIG. 1C, corresponds in general to virtual puppeteering systems 100A and 100B, in respective FIGS. 1A and 1B, and may share any of the characteristics attributed to those corresponding systems by the present disclosure. It is further noted that any feature in FIG. 1C identified by a reference number identical to a reference number appearing in FIG. 1A or FIG. 1B corresponds to that previously described feature and may share any of the characteristics attributed to it above.

According to the exemplary implementation shown in FIG. 1C, and in contrast to the implementations shown in FIGS. 1A and 1B, virtual puppeteering system 100C includes virtual reality (VR) viewer 138 communicatively coupled to portable device 110 by communication link 128, which, as noted above, may be a wired or wireless communication link. As further shown in FIG. 1C, according to the present exemplary implementation, VR viewer 138 is configured to be worn by user 120, and portable device 110 is configured to control VR viewer 138 to render animation 132 of object 122 on VR viewer 138. That is to say, in some implementations, VR viewer 138 may provide display screen 118, portable device 110 may be a handheld device serving as a controller for VR viewer 138, and sensors installed in real-world environment 101 may serve as a tracking system (sensors not shown in FIG. 1C). In those implementations no camera is required because objects in real-world environment 101 are tracked by the sensors and the entire interaction experienced by user 120 occurs within a virtual environment. It is noted that, in various implementations, VR viewer may take the form of a VR headset, VR goggles, or VR glasses, for example.

It is further noted that although FIG. 1C depicts portable device 110 and VR viewer 138 as being communicatively coupled but discrete components of virtual puppeteering system 100C, that implementation is merely exemplary. In other implementations portable device 110 and VR viewer 138 may be integrated into a single unit such that portable device 110 is VR viewer 138.

By way of overview, and with reference to FIGS. 1A, 1B, and 1C, in some implementations, as shown in FIG. 1A, exemplary virtual puppeteering system 100A uses augmented reality (AR) to render animation 132 of object 122 on display screen 118 of portable device 110. In other implementations, as shown in FIG. 1B, portable device 110 may be used in conjunction with projection device 126 to use AR to render animation 132 of object 122 on surface 130 in real-world environment 101. In yet other implementations, as shown in FIG. 1C, portable device 110 may be used in conjunction with VR viewer 138 to render animation 132 on VR viewer 138. For instance, in various implementations, user 120 may use a camera of portable device 110 and see a virtual character corresponding to object 122 standing on a table or any other surface through AR or VR. User 120 can then provide an input to portable device 110 to select the virtual character and may provide one or more animation inputs to portable device 110 to generate animation 132 of the virtual character. In implementations in which display screen 118 of portable device 110 is a touchscreen, for example, user 120 can virtually grasp the virtual character by pressing on the image of the virtual character shown on display screen 118.

According to one implementation, once grasped, the virtual character corresponding to object 122 can move in response to the physical movement of portable device 110 as if the virtual character were connected to portable device 110 by a rigid rod of length equal to distance 124. However, unlike real-world object 122, the virtual character corresponding to object 122 may be enhanced with animation effects simulating walking, running, jumping, crouching, or even playful interactions, such as building a snowman, for example, to generate animation 132 of object 122. In some implementations, animation 132 is generated by recognizing the gestures user 120 makes as he or she moves portable device 110. It is noted that, as described below by reference to FIGS. 6A and 6B, although in some implementations an object animated using the present virtual puppeteering systems and methods may be a real-world object, such as object 122, in other implementations, the object may be a virtual object.

It is further noted that although distance 124 is shown to be a distance corresponding to a spatial separation of object 122 from portable device 110, in some implementations, distance 124 may have zero length. When distance 124 is approximately zero, the experience for user 120 is one of having the virtual character corresponding to object 122 in their hand, in place of portable device 110. That use case may be particularly immersive in the case of VR because user 120 would see a moving and reacting virtual character instead of portable device 110 when portable device 110 is a handheld device.

Each of virtual puppeteering systems 100A, 100B, and 100C advantageously provide a novel interaction experience motivated by the traditional experience of moving a physical toy or other physical object. In some implementations, as portable device 110 is moved in physical space, that movement can be transferred directly and immediately to the virtual character shown in animation 132. Since the virtual character can either be visualized in real-world environment 101 using AR or visualized substantially entirely in a virtual world using VR viewer 138, the experience is one of having direct control over the virtual character corresponding to object 122. However, because the character is a virtual character, the present virtual puppeteering solution can advantageously apply sophisticated animations and other logic to enhance a user's enjoyment and perception of interactivity with object 122.

Figure 2:
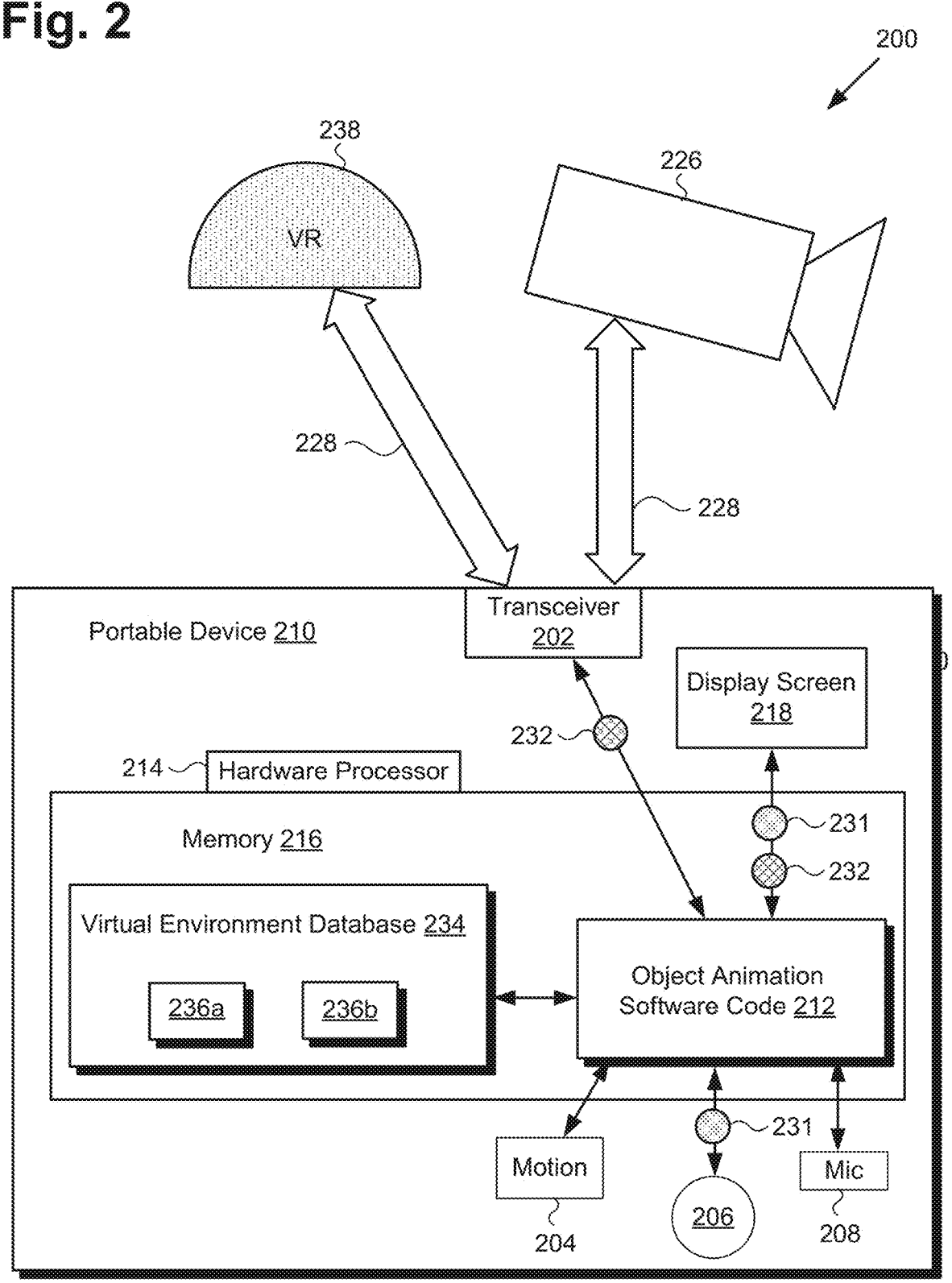
FIG. 2 shows a diagram including a more detailed exemplary representation of a portable device of the virtual puppeteering systems shown in FIGS. 1A, 1B, and 1C, according to one implementation.

FIG. 2 shows diagram 200 providing a more detailed representation of exemplary portable device 210. As shown in FIG. 2, portable device 210 may be communicatively coupled to either of projection device 226 or VR viewer 238 by communication link 228. Portable device 210 corresponds in general to portable device 110 in FIGS. 1A, 1B, and 1C, and those corresponding features may share any of the characteristics attributed to either of the corresponding features by the present disclosure. In addition, projection device 226, VR viewer 238, and communication link 228 correspond respectively in general to projection device 126, VR viewer 138, and communication link 128, in FIGS. 1B and 1C. Thus, projection device 226, VR viewer 238, and communication link 228 may share any of the characteristics attributed to respective projection device 126, VR viewer 138, and communication link 128 by the present disclosure, and vice versa.

As shown in FIG. 2, portable device 210 includes hardware processor 214 and memory 216 implemented as a non-transitory storage device. As further shown in FIG. 2, memory 216 contains object animation software code 212 and may optionally include virtual environment database 234 storing multiple virtual environments represented by exemplary virtual environments 236a and 236b. In addition, and as also shown by FIG. 2, portable device 210 may include any or all of transceiver 202, one or more motion sensors 204 (hereinafter "motion sensor(s) 204"), one or more cameras 206 (hereinafter "camera(s) 206"), and one or more microphones 208 (hereinafter "microphone(s) 208"). Also shown in FIG. 2 is image 231 generated by camera(s) 206, and animation 232 generated by object animation software code 212 when executed by hardware processor 214. It is noted that animation 232 corresponds in general to animation 132, in FIGS. 1A, 1B, and 1C, and those corresponding features may share any of the characteristics attributed to either corresponding feature by the present disclosure.

Display screen 218 of portable device 210 corresponds in general to display screen 118 of portable device 110, in FIGS. 1A, 1B, and 1C. Thus, display screen 218 may share any of the characteristics attributed to display screen 118 by the present disclosure, and vice versa. As noted above, portable device 210 corresponds in general to portable device 110, in FIGS. 1A, 1B, and 1C. Thus, although not shown in FIGS. 1A, 1B, and 1C, like portable device 210, portable device 110 may include features corresponding to hardware processor 214, transceiver 202, motion sensor(s) 204, camera(s) 206, microphone(s) 208, and memory 216 storing object animation software code 212.

Transceiver 202 may be implemented as communication hardware and software enabling portable device 110/210 to engage in wireless communication over a cellular telephone network, and/or over a packet-switched network such as the Internet. For example, transceiver 202 may be implemented as a fourth generation of broadband cellular technology (4G) wireless transceiver, or as a 5G wireless transceiver configured to satisfy the IMT-2020 requirements established by the International Telecommunication Union (ITU). Alternatively, or in addition, transceiver 202 of portable device 110/210 may be configured to communicate via one or more of WiFi, Bluetooth, ZigBee, and 60 GHz wireless communications methods.

Motion sensor(s) 204 may include one or more accelerometers, and/or gyroscopes, and/or a GPS receiver, and/or a magnetometer, for example. In some implementations, motion sensor(s) 204 may be implemented as an inertial measurement unit (IMU), as known in the art. Microphone(s) 208 may include any one or more microphones suitable for use in receiving voice inputs by a smartphone or tablet computer, for example. Camera(s) 206 may include one or more red-green-blue (RGB) still image cameras and/or video cameras. In some implementations, camera(s) 206 may correspond to an array of RGB still image and/or video cameras configured to generate a panoramic image. Moreover, in some implementations, camera(s) 206 may include a light detection and ranging (LIDAR) device.

As noted above by reference to FIG. 1C, in some implementations, camera(s) 206 and display screen 118/218 may be omitted from portable device 110/210. In such implementations, for example, VR viewer 138/238 may provide display screen 118/218, portable device 110/210 may be a handheld device serving as a controller for VR viewer 138/238, and sensors installed in real-world environment 101 may be used as a tracking system. Consequently, in those implementations camera(s) 206 is/are not required because objects in real-world environment 101 are tracked by the sensors and the entire interaction experienced by user 120 occurs within a virtual environment.

According to the exemplary implementation shown in FIG. 2, object animation software code 212 may be persistently stored in memory 216 and may be executed locally on portable device 110/210 by hardware processor 214. It is noted that, although the present application refers to object animation software code 212 as being stored in memory 216 for conceptual clarity, more generally, memory 216 may take the form of any computer-readable non-transitory storage medium. The expression "computer-readable non-transitory storage medium," as used in the present application, refers to any medium, excluding a carrier wave or other transitory signal that provides instructions to hardware processor 214 of portable device 110/210. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Figure 3:
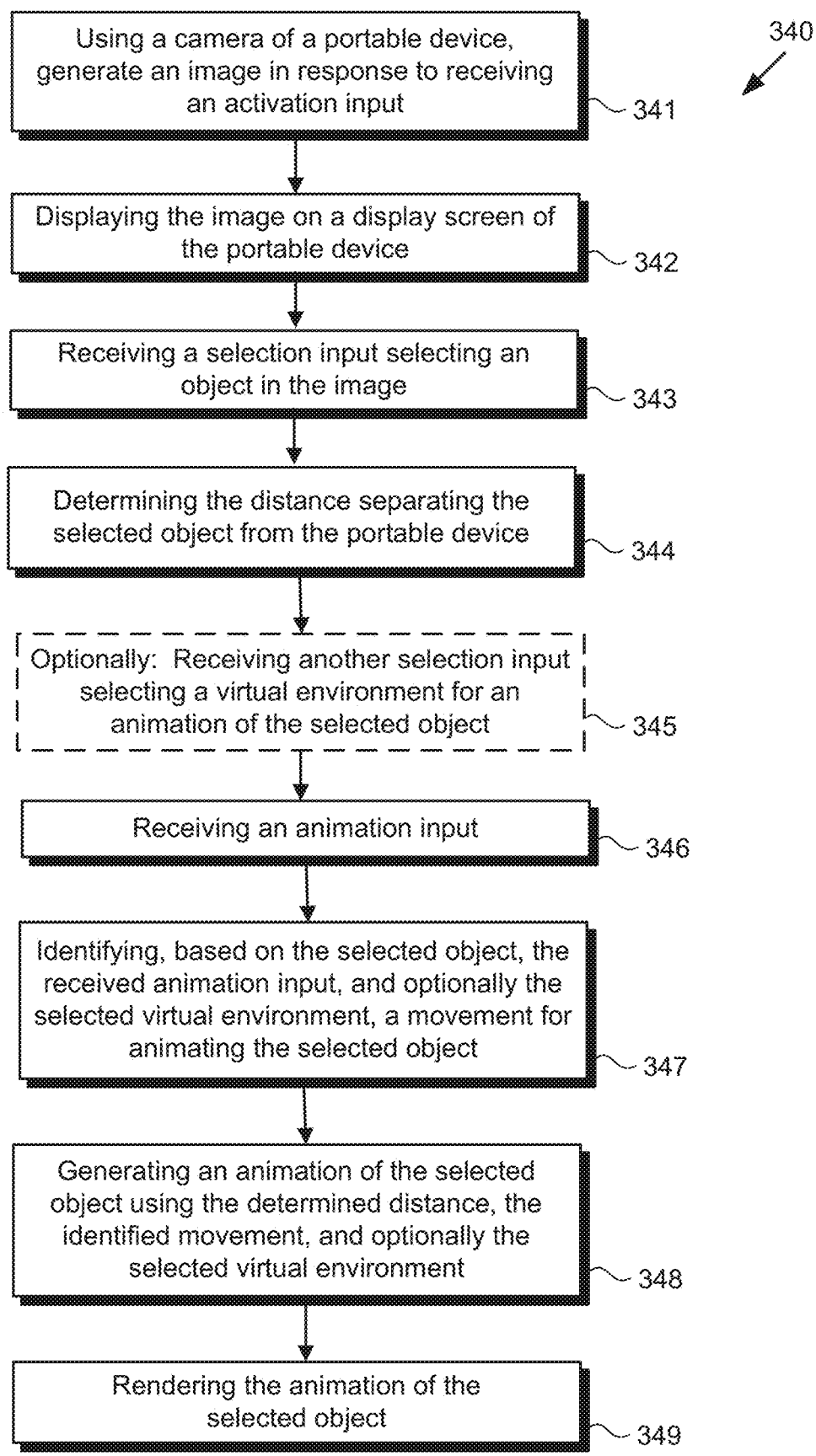
FIG. 3 is a flowchart presenting an exemplary method for use by a virtual puppeteering system, according to one implementation.

The functionality of object animation software code 212 will be further described by reference to FIG. 3 in combination with FIGS. 1A, 1B, 1C, and 2. FIG. 3 shows flowchart 340 presenting an exemplary method for use by a virtual puppeteering system. With respect to the method outlined in FIG. 3, it is noted that certain details and features have been left out of flowchart 340 in order not to obscure the discussion of the inventive features in the present application.

Referring to FIG. 3 in combination with FIGS. 1A, 1B, 1C and 2, flowchart 340 begins with using camera(s) 206 of portable device 110/210 to generate image 231 in response to receiving an activation input (action 341). The activation input to which action 341 is in response may be one or more inputs from user 120 to portable device 110/210 that turn camera(s) 206 on and point camera(s) 206 toward object 122. As a result, object 122 may be shown in image 231. By way of example, although a camera on a smartphone or tablet computer does not typically take a picture until a user presses a button to capture an image, merely turning on the camera and pointing it toward an object will result in the image of the object being displayed to the user through a viewfinder of the camera interface.

As noted above, the activation input to which action 341 is in response may be one or more inputs from user 120 that turn camera(s) 206 on and point camera(s) 206 toward object 122. Thus, such an activation input may include a combination of different inputs from user 120, such as a voice command to turn camera(s) 206 on, and manual manipulation of portable device 110/210, or head movement by user 120 when portable device 110/210 is coupled to VR viewer 138 worn by user 120, to point camera(s) 206 toward object 122. Generation of image 231 using camera(s) 206 in response to the activation input may be performed by object animation software code 212, executed by hardware processor 214.

Flowchart 340 continues with displaying image 231 on display screen 118/218 of portable device 110/210 (action 342). As noted above, in some implementations, display screen 118/218 may be a touchscreen display in the form of an LCD, LED display, OLED display, or a display screen implemented using any other suitable display technology that performs a physical transformation of signals to light. The display of image 231 on display screen 118/218 may be performed by object animation software code 212, executed by hardware processor 214.

Flowchart 340 continues with receiving a selection input selecting object 122 shown in image 231 (action 343). The selection input received in action 343 may take a variety of forms. In some implementations, for example, user 120 may utilize a selection tool shown on display screen 118/218, such as selection box, bullseye, or other type of indicator to select object 122 shown in image 231. In implementations in which display screen 118/218 of portable device 110/210 is a touchscreen, the selection input may include applying a touch or gesture to display screen 118/218. Examples of gestures may include swipes, such swipe left, swipe right, swipe up, or swipe down, or double taps, or a finger drag applied to display screen 118/218, to name a few.

Alternatively, in some implementations, the selection input received in action 343 may be a voice input to microphone(s) 208 that describes, names, or otherwise identifies object 122 in image 231. Action 343 may be performed by object animation software code 212, executed by hardware processor 214.

Flowchart 340 continues with determining distance 124 separating selected object 122 from portable device 110/210 (action 344). In some implementations, distance 124 may be determined through radio-signal triangulation performed using transceiver 202. Alternatively, or in addition, in some implementations distance 124 may be determined using a LIDAR device included among camera(s) 206. As discussed below, in some implementations, distance 124 may be an important parameter when generating animation 132 of selected object 122. Determination of distance 124 in action 344 may be performed by object animation software code 212, executed by hardware processor 214.

In some implementations, flowchart 340 may continue with optionally receiving another selection input selecting one of virtual environments 236a or 236b for an animation of selected object 122 (action 345). By way of example, virtual environment 236a may be a virtual field of snow for an animation in which the virtual character corresponding to selected object 122 builds a snowman. As another example, virtual environment 236b may be an obstacle course or other activity venue for selected object 122.

It is noted that in implementations in which optional action 345 is omitted, the virtual character corresponding to object 122 may simply appear against the portion of real-world environment 101 providing the background of image 231. That is to say, camera(s) 206 of portable device 110/210 may be used to detect objects in the real-world environment for the virtual character corresponding to object 122 to interact with. Examples of such interactions with real-world environment objects may include scaling or jumping onto a real-world object, or virtually digging into a wall or floor of the real-world environment.

The selection input received in optional action 345 may take a variety of forms. In some implementations, for example, user 120 may select one of virtual environments 236a or 236b from a list of virtual environments or thumbnails depicting those virtual environments, displayed on display screen 118/218 of portable device 110/210. In implementations in which display screen 118/218 is a touchscreen, the virtual environment selection input may include applying a touch or gesture to display screen 118/218. In some implementation, display screen 118/218 may provide a search field into which user 120 may enter a keyword for identifying one of virtual environments 236a or 236b. Alternatively, in some implementations, the selection input received in action 345 may be a voice input to microphone(s) 208 that describes, names, or otherwise identifies one of virtual environments 236a or 236b. Optional action 345 may be performed by object animation software code 212, executed by hardware processor 214.

Flowchart 340 continues with receiving an animation input (action 346). The animation input used in part to identify the movement of selected object 122 may take any of several forms. For example, in some implementations, such an animation input may include a voice input to microphone(s) 208 of portable device 110/210. Alternatively, the animation input may include a gesture applied to display screen 118/218 of portable device 110/210. Nevertheless, action 347 below will be described in detail by reference to implementations in which the animation input includes motion of portable device 110/210 detected by motion sensor(s) 204 of portable device 110/210.

Flowchart 340 continues with identifying, based on selected object 122, the animation input received in action 346, and in some implementations based also on virtual environment 236a or 236b selected as a result of optional action 345, a movement for animating selected object 122 (action 347). The movement for animating selected object 122 may be one of walking, running, crouching, or jumping, for example, and may be identified in action 347 by object animation software code 212, executed by hardware processor 214.

In the specific implementation in which the animation input includes motion of portable device 110/210 detected by motion sensor(s) 204, user 120 manipulates portable device 110/210 capable of tracking its orientation, position, and movement in space. As discussed above, user 120 can point camera(s) 206 of portable device 110/210 towards object 122 and select object 122 by providing an input to portable device 110/210. Moreover, distance 124 separating selected object 122 from portable device 110/210 that is determined in action 344 may be maintained as a fixed distance when animation 132 of selected object 122 is generated.

When used in this way, the distance and relative rotation with respect to portable device 110/210 of the virtual character corresponding to selected object 122 in animation 132 is maintained, giving this control scheme a very responsive and direct feel. For example, motion sensor(s) 204 may be used to identify the orientation of portable device 110/210 when distance 124 is determined in action 344. Motion sensor(s) 204 may be used thereafter to determine a later orientation of portable device 110/210, and a comparison of that later orientation with the orientation of portable device during action 344 may be used to maintain the relative rotation.

In some such use cases, the fixed distance constraint can be relaxed, especially to handle collisions. For example, if animation 132 of selected object 122 would appear to push the virtual character corresponding to selected object 122 into a floor or wall, distance 124 may be shortened appropriately in order to prevent the virtual character depicting selected object 122 from appearing to phase through another solid object.

As noted above, identification of a movement for animating selected object 122 in action 347 may be performed by object animation software code 212, executed by hardware processor 214. It is also noted that although the following discussion refers to selected object 122 as an inanimate doll representing a humanoid, in other implementations, selected object 122 may be a quadruped, and in some use cases may be a living being, such as a household pet, or a personal friend serving as the subject of a virtual puppeteering experience.

With respect to action 347 in implementations in which the animation input is motion of portable device 110/210 by user 122, and distance 124 is maintained as a substantially fixed distance in animation 132 of selected object 122, object animation software code 212 may utilize a state machine to determine how the virtual character corresponding to selected object 122 is animated so as to react in real-time to the movements of user 120. For example, in one state the virtual character stands on the ground but as soon as user 120 flicks portable device 110/210 up, the virtual character transitions to the jump state. Each state can be defined by its internal logic, root position, the configuration of the character movement, and the inverse kinematic (IK) state. The context of the state machine can include real-world environment 101 surrounding selected object 122, as well as the virtual environment optionally selected in action 345, as well as the animation input, i.e., motion of portable device 110/210. One state is the active state and at every time-step its logic updates the state of animation 132 based on the context. Events can be defined that trigger a state change, resulting in another state becoming the active state and changing the behavior of the virtual character.

Maintaining distance 124 as a fixed distance during animation 132 does not restrict the manipulation of the virtual character corresponding to selected object 122 by user 120. As a result, portable device 110/210 must be prepared for any input, even when no predefined movement by the virtual character is appropriate. The present solution handles such unexpected inputs by having a default state that is activated when such a situation arises. One suitable default state would be to turn the virtual character into a ragdoll. Such a default state could be used when a virtual character having no jump momentum is held in the air: instead of having a character with an inappropriate jumping animation in the air, user 122 would instead be holding a virtually simulated ragdoll.

Unpredictable user inputs also mean that animations with a high degree of interaction with real-world environment 101 and/or virtual environment 236a or 236b have to be adapted (e.g., the virtual character picks up an object from different directions and poses). In these cases, inverse kinematics can be used to adapt movements by the virtual character to the given situation. For example, when the virtual character picks up an object, its hands are moved close to the object independently of the underlying identified movement for animating the virtual object.

One challenge when animating selected object 122 as described in the foregoing is that the input motion of portable device 110/210 is typically very continuous. Consequently, and in contrast to interfaces that respond to discrete user inputs, such as button pushes, the present approach cannot simply play a limited set of preexisting animation clips. For example, if animations are defined for walking and running states, it may be unclear which movement to identify for animating selected object 122 when the manipulation speed is between the two. The present solution addresses this challenge through use of animation blending. Various algorithms for blending animation clips are known in the art, for example, linear blending algorithms and cubic blending algorithms. Because the present solution is agnostic to any particular algorithm, that is to say the present method can be used with any of them, the blending algorithm implemented herein is treated as a black box.

Object animation software code 212 is configured to use a small set of predetermined animation movements and postures, such as less than ten animation movements and postures, for example, that can be used to blend together new ones. Each predetermined animation movement or posture can have N blend parameters $p_{i,j} \in [0,1]$, that are used to place it in an N-dimensional blend space, for example, such a point may be denoted as $p_i = (p_{i,1} \ldots p_{i,N})$. Given a new point p in that space, the blending algorithm returns a new animation movement that is a combination of the neighboring ones.

Figure 4:
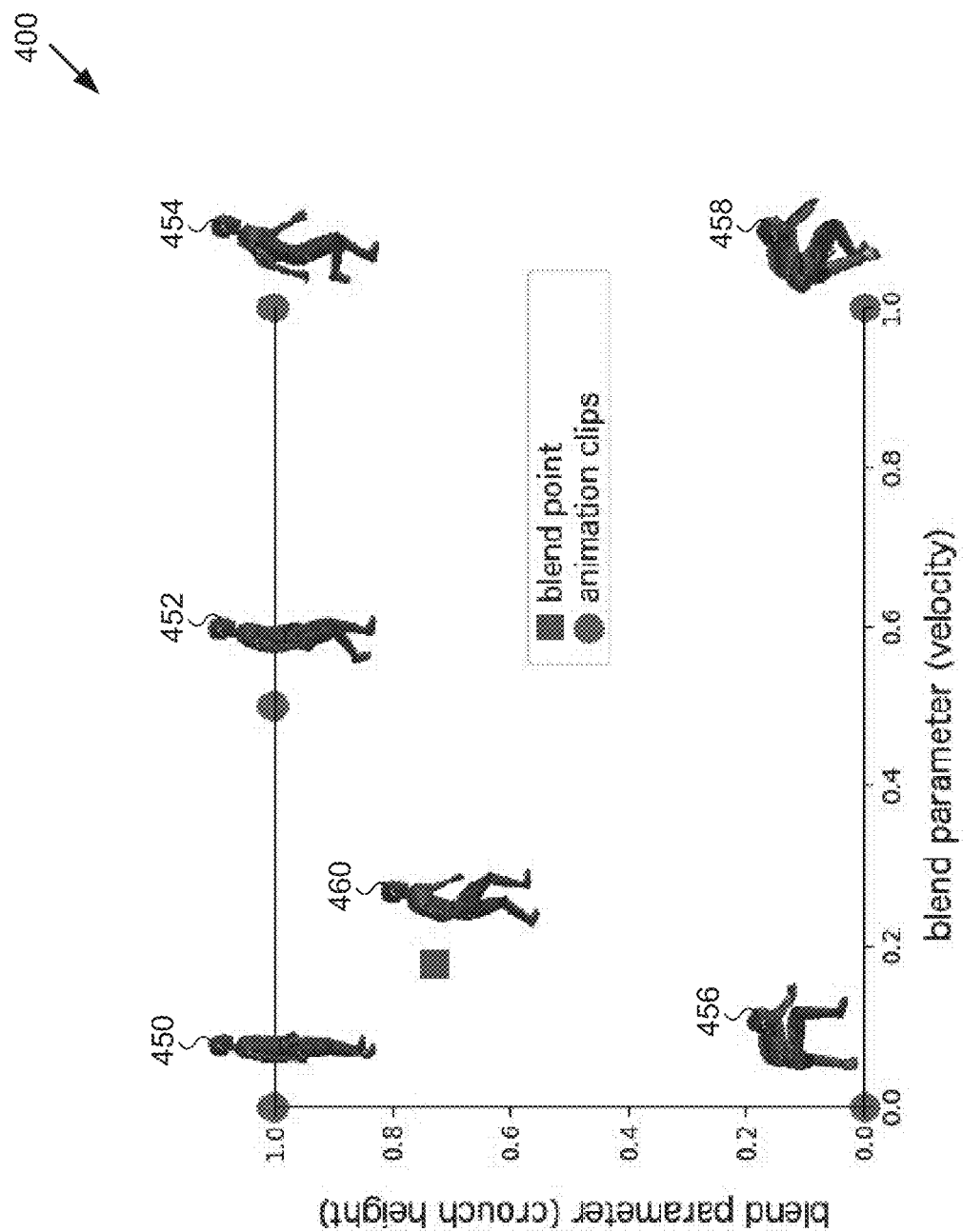
FIG. 4 shows an exemplary blend-space graph for use by a virtual puppeteering system to identify a movement for animating an object, according to one implementation.

FIG. 4 shows exemplary blend-space graph 400 for use in identifying an animation movement in action 347, according to one implementation. As shown in FIG. 4, blend-space graph 400 includes five predetermined animation movements and postures: standing 450, walking 452, running 454, crouching 456, and walking while crouching 458. Each predetermined animation movement has two blend parameters, one corresponding to movement velocity and the other corresponding to posture height. The challenge is to map the values from the animation input, i.e., the position, orientation and motion of portable device 110/210 to the blending parameters p($u_i$). According to the example shown in FIG. 4, movement 460 identified in action 347 is a blend of predetermined animation movements having blend parameters $p_{velocity}$=0.2 and $p_{height}$=0.73.

In implementations in which the animation input is motion of portable device 110/210 by user 122, the velocity of the motion determines the movement (e.g., walking vs running) and user 122 needs to maintain the motion in order for the virtual character to keep performing the movement. That is to say, in those implementations, the virtual character moves only if portable device 110/210 moves as well. Moreover, increasing the speed of the motion of portable device 110/210 can cause the virtual character to transition from a walking movement to a running movement, for example, while slowing the speed of motion of portable device 110/210 may have the opposite effect. Voice inputs such as "fast," "slow," "high step," and "low step," for example, can also be used to fine tune the movement produced by the animation input received in action 346.

As noted, voice and touchscreen inputs can provide secondary information to indicate how to perform a particular movement. For example, a motion input consistent with a walking movement accompanied by a voice command "be sad" may cause the virtual character corresponding to object 122 to walk with a sad expression, or with its head bowed. It is noted that in implementations in which the animation input is motion of portable device 110/210 by user 122, touchscreen inputs and/or voice inputs do not replace motion of portable device 110/210 but augments it. For example, in the case of movement of the legs of the virtual character, user 122 could be moving portable device 110/210 so that the virtual character walks or run, and may concurrently slide their finger up on a touchscreen or say "high step" so that the virtual character performs the walking or running movement while raising its legs higher. It is further noted that voice and touchscreen input actions can either be associated to a global change in the animation (e.g., being sad could mean that all movements will be performed with the head bowed or with a different facial expression) or be associated with a totally different movement.

Most mappings are linear, which makes the computation of p($u_i$) straightforward. For example, the height $u_{height}$ of portable device 110/210 can be mapped linearly to the crouching height: p($u_{height}$)=($u_{height}$−a)*1/(b−a), clamped to [0,1]. However, other mappings are non-linear, in particular the velocity $u_{velocity}$ of portable device 110/210. This is especially important because an inexact mapping would identify the wrong animation movement and result in foot sliding artifacts. This additional challenge is addressed by creating a lookup table and making it continuous using inverse distance weighting.

Figure 5:
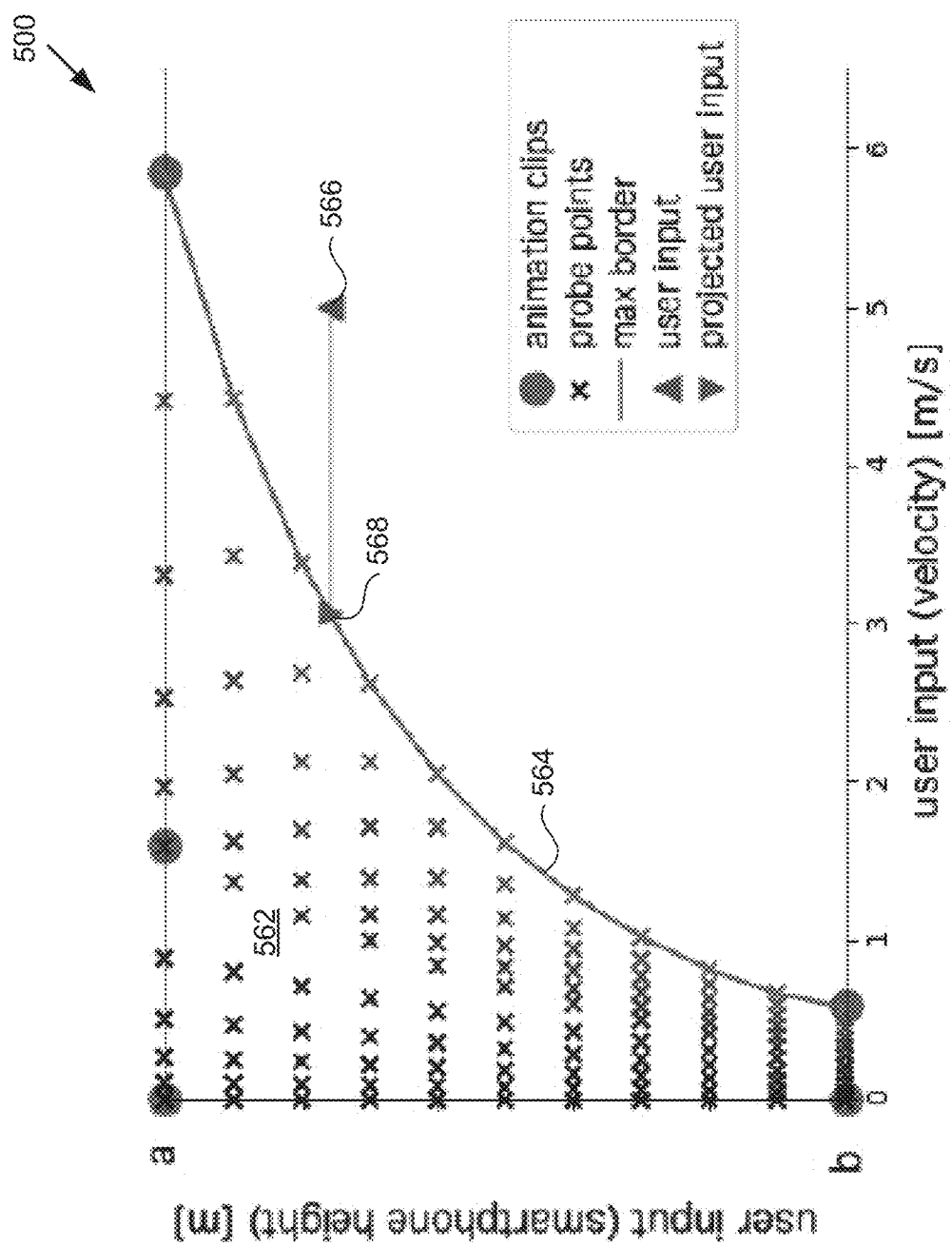
FIG. 5 shows an exemplary lookup table for use by a virtual puppeteering system to identify a movement for animating an object, according to one implementation.

Such a lookup table can be filled by choosing a set of probe points $p_k'$ in the blend space with a high enough density (e.g., in a grid). The user properties $u_k'$ of these probe points can be measured automatically by blending the corresponding animation movement and then measuring its properties, for example the movement velocity. With that, when user 120 provides new input values u, the corresponding blend parameters can be computed using inverse distance weighting:

$$p(u) = \begin{cases} \dfrac{\sum_k w_k(u) p_k^*}{\sum_k w_k(u)}, & \text{if } d(u, u_k^*) \neq 0 \text{ for all } i \\ p_k^*, & \text{if } d(u, u_k^*) = 0 \text{ for some } i \end{cases} \quad \text{(Equation 1)}$$

with $$w_k(u) = \dfrac{1}{d(u, u_k^*)^q} \quad \text{(Equation 2)}$$

where d is the Euclidean distance between two points and q∈R+ the power parameter. It is noted that in the specific example use case described above, q=7. It is further noted that a high q leads to a "sharper" resolution but requires a higher density of probe points to prevent jerky transitions. FIG. 5 shows exemplary lookup table 500 obtained from example blend-space graph 400, in FIG. 4. The fact that border 564, defined by all animation movements for which $p_{velocity}$=1, is not a straight line demonstrates that the mapping of the velocity parameter is non-linear in this exemplary implementation.

In some instances, the animation input 566 (u) provided by user 120 may be outside of the defined area of possible movements 562. For example, user 120 may move portable device 110/210 so fast that no movement can be blended to match that velocity. To address that situation, the actual user input 566 (u) is projected onto border 564 of the set of feasible movements, resulting in projected user input 568 (u'). It is noted that in higher dimensions, border 564 would be a multi-dimensional mesh. In the case of movement velocity, the speed of the movement may be increased by a factor $$\dfrac{u_{velocity}}{u'_{velocity}}$$

in order to achieve motion with the desired velocity.

Flowchart 340 continues with generating animation 132/232 of selected object 122 using the determined distance 124, the movement identified in action 347, and in some implementations also using virtual environment 236a or 236b selected as a result of optional action 345 (action 348). Animation 132/232 may be generated by object animation software code 212, executed by hardware processor 214, as described in greater detail below.

Figure 6A:
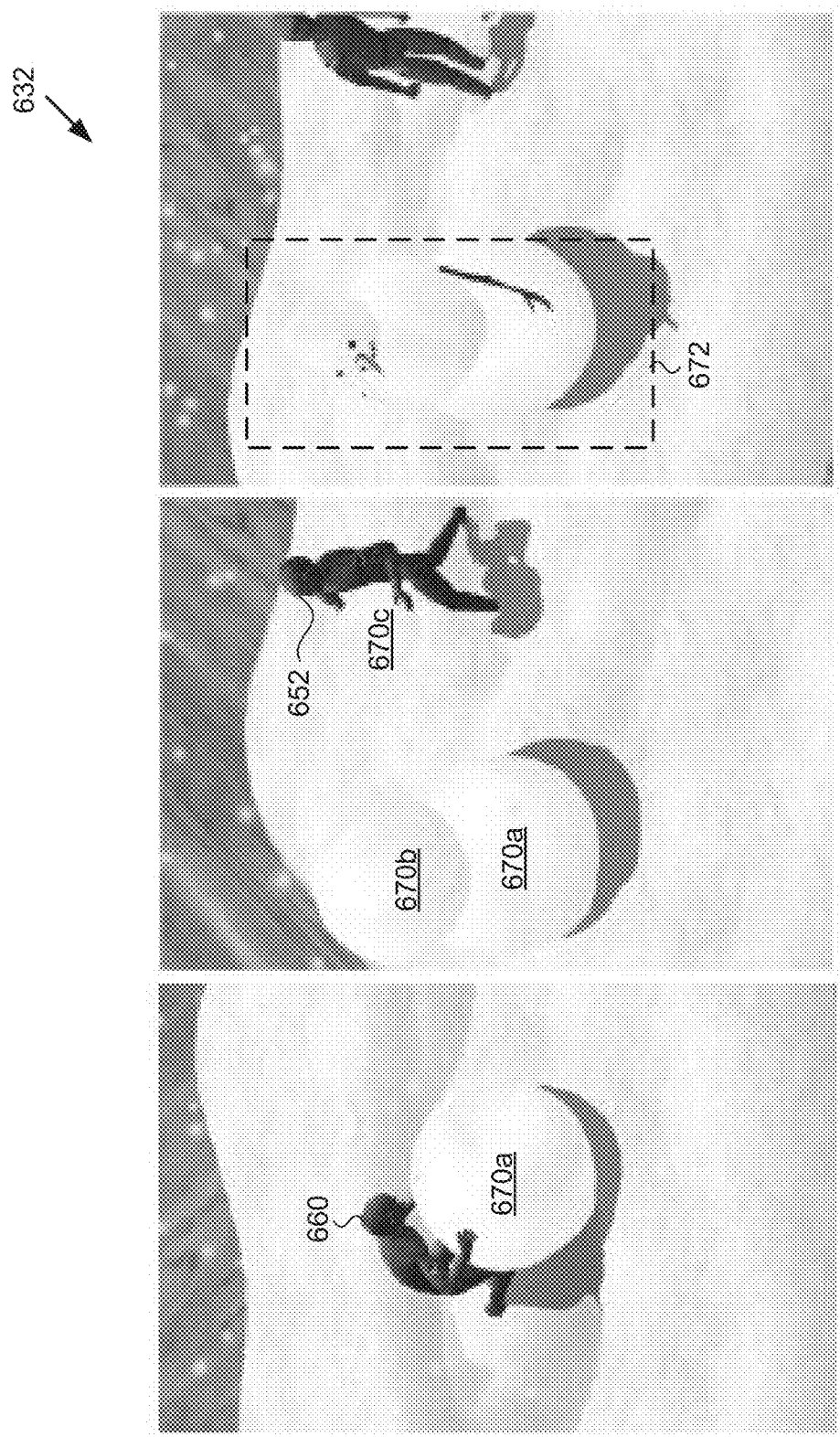
FIG. 6A shows an exemplary animation generated by a virtual puppeteering system, according to one implementation.

In one implementation, animation 132/232 of selected object 122 may be generated based on seven basic movements or postures including standing idly, walking, running, idly crouching, walking crouched, get-up, and mid-jump. Animation 132/232 of selected object 122 may be generated through blending of those movements, the default ragdoll state, and inverse kinematics. Referring to FIG. 6A, for example, FIG. 6A shows animation 632 in which virtual character 660 corresponding to selected object 122 is animated to roll snowball 670a. It is noted that animation 632 corresponds in general to animation 132/232 in FIGS. 1B and 2. Consequently, animation 632 may share any of the characteristics attributed to corresponding animation 132/232 by the present disclosure, and vice versa.

The rolling of snowball 670a by virtual character 660 is made possible using the crouched posture and placing the hands of virtual character 660 on the surface of snowball 670a. The animation input provided by user 122 can include the position, velocity, and orientation of portable device 110/210 in space. Additionally, touchscreen display screen 118/218 can be used as a single button to select virtual object 122 depicted in animation 132/232/632. No other buttons or inputs may necessarily be required, which advantageously makes the interface extremely easy to learn. The environment of the state machine discussed above contains distance 124 and manipulable objects included in image 231.

It is noted that although the animation input for making virtual character 660 jump may simply be to lift up portable device 110/210 with a high enough velocity, a compelling jump animation requires virtual character 660 to squat before becoming airborne (i.e., the Anticipation principle of animation). As a result, in some implementations, a short delay is enforced between the user movement providing the animation input and the jump, in order to build that anticipation. The ensuing jump path can be estimated with a 2-dimensional parabola when looking from the side view. At each frame the parabola is calculated given the starting position of the jump $(x_0, y_0)$, the current position $(x_t, y_t)$ and the current slope of the jump $y'_t$:

$$y(x) = ax^2 + bx + c \qquad \text{(Equation 3)}$$

where $$a = \frac{y'_t(x_t - x_0) - y_t + y_0}{(x_t - x_0)^2}$$

$$b = \frac{y'_t(x_0^2 - x_t^2) - 2x_t(y_t - y_0)}{(x_t - x_0)^2}$$

$$c = \frac{x_t^2(y'_t x_0 + y_0) - x_t x_0(y'_t x_0 + 2y'_t) + y'_t x_0^2}{(x_t - x_0)^2}$$

The position of the apex, $$\left(\frac{-b}{2a}, y\left(\frac{-b}{2a}\right)\right),$$

can be used to animate the virtual character accordingly. Furthermore, if a jump is considered to be invalid the virtual character can be placed in the default ragdoll state. A jump may be considered invalid if: (1) the virtual character rises again after starting its descent (i.e., there are multiple apexes), (2) the virtual character turns while in air absent an input prompting such a turn, or (3) the virtual character stops or levitates in the air, for example. If no invalidating circumstance is present, the virtual character returns to the ground and may absorb the shock of the landing by performing a short crouch. It is noted that although an unprompted turn while in the air may indicate an invalid jump, the virtual character can validly rotate while in the air if prompted to do so. For example the voice input "flip" or a circular gesture applied as a touchscreen input to display screen 118/218 while moving portable device 110/210 may be used to prompt a rotation. In that case, the virtual character would add a rotation to its movement. For example, if the motion of the virtual character were to be a jump prior to the flip prompt, the virtual character might flip in mid jump. By contrast, if the motion of the virtual character were to be walking or running prior to the flip prompt, the virtual character might execute a forward roll during that motion, which might be a slow roll if walking or a fast roll if running.

Figure 6B:
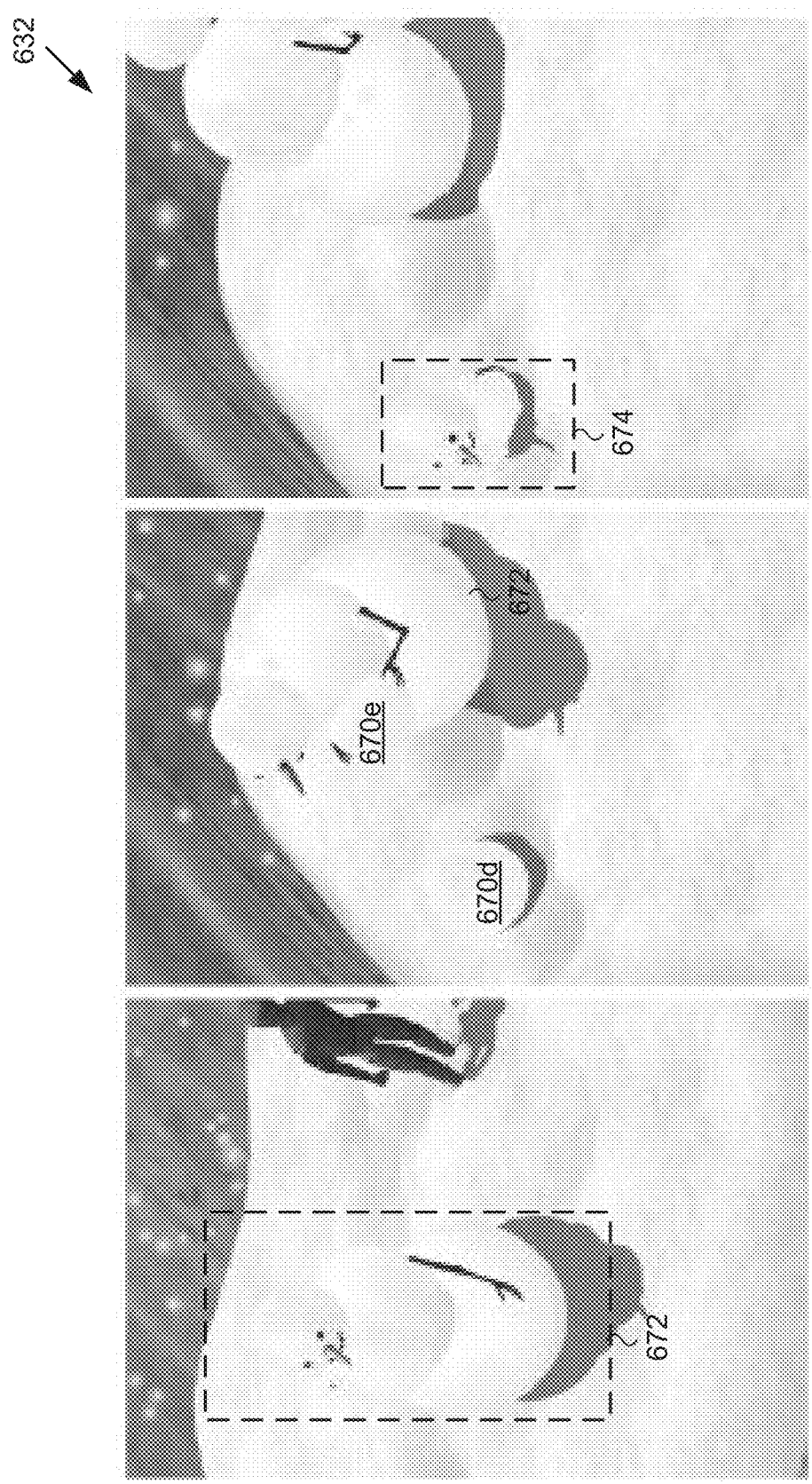
FIG. 6B shows additional actions performed in the animation initiated in FIG. 6A, according to one implementation.

FIGS. 6A and 6B show snowman building animation 632. The present virtual puppeteering solution enables user 120 in FIGS. 1A, 1B, and 1C to animate virtual character 660 depicting selected object 122 to build snowman 672 out of snowballs 670a, 670b, and 670c, that can be rolled to variable diameters (see FIG. 6A). As illustrated in FIG. 6B, a virtual character corresponding to a virtual object, such as snowman 672, may then be selected by user 120 to replace virtual character 660 depicting selected object 122 in animation 632. Selection of snowman 672 by user 120 causes snowman 672 to appear to come to life and to be controlled just like virtual character 660 of object 122. Consequently, snowman 672 can also crouch, jump and even build another snowman 674 using snowballs 670d and 670e, which can subsequently be selected by user 120 and controlled as described above. Thus, as noted above, an object animated using the present virtual puppeteering systems and methods may be a real-world object, such as object 122, or a virtual object, such as snowman 672 or snowman 674.

It is noted that snowman building animation 632 is generated in part from the virtual environment input received in action 345 identifying the virtual environment as a field of snow. That optionally selected virtual environment is yet another input, analogous to voice and touchscreen gesture, for use in generating the animation of virtual character 660. If there is no snow, building a snowman is simply not possible. However, as noted above by reference to optional action 345, a virtual environment for animation of virtual character 660 that includes snow may be invoked in various ways. For example, referring to FIGS. 1A, 1B, 1C and 2, user 120 may select one of virtual environments 236a or 236b from a list of virtual environments or thumbnails depicting those virtual environments, displayed on display screen 118/218 of portable device 110/210. In implementations in which display screen 118/218 is a touchscreen, the virtual environment selection input may include applying a touch or gesture to display screen 118/218. In some implementations, display screen 118/218 may provide a search field into which user 120 may enter a keyword for identifying one of virtual environments 236a or 236b. Alternatively, in some implementations, the selection input received in action 345 may be a voice input to microphone(s) 208 that describes, names, or otherwise identifies one of virtual environments 236a or 236b.

Referring once again to FIGS. 6A and 6B, it is further noted that because snowballs 670a, 670b, 670c, 670d, and 670e making up snowmen 672 and 674 have variable sizes, the proportions of the snowmen must also be variable. In some implementations, that snowman proportion variability can be achieved by extending specific bones of the snowman rig, for example, by adapting the length of the neck to accommodate for the head size. However, having an overly elongated bone can result in very stiff movements. That further problem can be resolved by interpolating the snowball positions between chest and pelvis with a quadratic Bezier curve. The control points may be the pelvis position, the chest position, and the point $p_1$ defined as:

$$p_1 = \frac{p_{pelvis} + (1 - b) \cdot p_{chest} + b \cdot p_{up}}{2} \qquad \text{(Equation 4)}$$

where $p_{up}$ is the position of the chest when the snowman is standing upright, and b is a bend factor that may vary between zero and one.

Flowchart 340 can conclude with rendering animation 132/232/632 of selected object 122 (action 349). Rendering of animation 132/232/632 in action 349 may be performed by object animation software code 212, executed by hardware processor 214, and using one of display screen 118/218, projection device 126/226, or VR viewer 138/238. That is to say, as shown in FIGS. 1A and 2, in some implementations, hardware processor 214 of portable device 110/210 may execute object animation software code 212 to render animation 232 of selected object 122 on display screen 118/218 of portable device 110/210, which may be an LCD, light-emitting LED display, or an OLED display, for example.

As shown in FIGS. 1B and 2, in some implementations, virtual puppeteering system 100B includes projection device 126/226 communicatively coupled to portable device 110/210. In those implementations, hardware processor 214 may execute object animation software code 212 to render animation 132/232 of selected object 122 by projecting animation 132/232 onto surface 130 in real-world environment 101. As noted above, when implemented as one or more projectors, projection device 126/226 may include a stand-alone wide-field projection system, or may be implemented as a fisheye lens projector, or as multiple stitched projection-mapped video projectors, for example. However, in other implementations, projection device 126/226 may be configured to render animation 132 as a 3D animation. For example, projection device 126/226 may take the form of a 3D projection system, or a 2D display configured to spin so as to generate an apparently 3D image.

Alternatively, and as shown in FIGS. 1C and 2, in some implementations, virtual puppeteering system 100C includes VR viewer 138/238 communicatively coupled to portable device 110/210. Moreover, and as noted above, in some implementations portable device 110/210 and VR viewer 138/238 may be integrated into a single unit such that portable device 110/210 is VR viewer 138/238. In all those implementations, hardware processor 214 may execute object animation software code 212 to render animation 232 of selected object 122 as a VR animation.

Thus, the present application discloses virtual puppeteering systems and methods that overcome the drawbacks and deficiencies in the conventional art. According to the present novel and inventive concepts, the virtual puppeteering systems and methods disclosed herein improve on the state-of-the-art by advantageously providing a novel interaction experience motivated by the traditional experience of moving a physical toy. As a portable device that generates an animation receives an animation input, such as being moved in physical space or by receiving a voice or touchscreen input, movements can be transferred directly and immediately to the virtual character animating a selected object. Because the virtual character can either be visualized in the real-world using AR or visualized substantially entirely in a virtual world using VR, the experience is one of having direct control over the virtual character. However, because the character is a virtual depiction of the physical toy or other object selected by the user, the present virtual puppeteering solution can advantageously apply sophisticated animations and other logic to enhance the user's enjoyment and perception of interactivity.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A virtual puppeteering system comprising:
   a portable device including a camera, a display, a hardware processor, and a system memory storing an object animation software code;
   the hardware processor configured to execute the object animation software code to:
   generate, using the camera, an image in response to receiving an activation input;
   display the image on the display;
   receive a selection input selecting an object shown in the image;
   determine a distance separating the selected object from the portable device;
   receive a first animation input including a physical movement of the portable device;
   identify, based on the selected object and in response to the first animation input, a movement for animating the selected object;
   generate an animation of the selected object using the determined distance and the identified movement, wherein the animation moves the selected object as if the selected object is connected to the portable device and maintains the determined distance separating the selected object from the portable device as a fixed distance; and
   render the animation of the selected object.

2. The virtual puppeteering system of claim 1, wherein the portable device further comprises a motion sensor, and wherein the first animation input is received from the motion sensor.

3. The virtual puppeteering system of claim 1, wherein the portable device further comprises a microphone, and wherein a second animation input for animating the selected object is a voice input to the microphone.

4. The virtual puppeteering system of claim 1, wherein the display comprises a touchscreen of the portable device, and wherein a second animation input for animating the selected object is one of a touch or a gesture applied to the touchscreen.

5. The virtual puppeteering system of claim 1, wherein the hardware processor is further configured to execute the object animation software code to render the animation of the selected object on the display of the portable device.

6. The virtual puppeteering system of claim 1, further comprising a projection device communicatively coupled to the portable device, and wherein the hardware processor is further configured to execute the object animation software code to render the animation of the selected object by projecting the animation onto a surface in a real-world environment using the projection device.

7. The virtual puppeteering system of claim 1, wherein the hardware processor is further configured to execute the object animation software code to:
   receive another selection input selecting a virtual environment for the animation of the selected object;

identify the movement for animating the selected object further based on the selected virtual environment; and
generate the animation of the selected object further using the selected virtual environment.

8. The virtual puppeteering system of claim 1, wherein the selected object is a real-world object, and wherein the identified movement for animating the selected object is one of walking, running, crouching, or jumping.

9. A virtual puppeteering system of comprising:
a portable device including a camera, a display, a hardware processor, and a system memory storing an object animation software code;
the hardware processor configured to execute the object animation software code to:
generate, using the camera, an image in response to receiving an activation input;
display the image on the display;
receive a selection input selecting an object shown in the image;
determine a distance separating the selected object from the portable device;
receive a first animation input including a physical movement of the portable device;
identify, based on the selected object and in response to the first animation input, a movement for animating the selected object;
generate an animation of the selected object using the determined distance and the identified movement, wherein the animation moves the selected object as if the selected object is connected to the portable device by a rigid rod of length equal to the determined distance; and
render the animation of the selected object.

10. A method for use by a virtual puppeteering system including a portable device having a camera, a display, a hardware processor, and a system memory storing an object animation software code, the method comprising:
generating, using the camera by the object animation software code executed by the hardware processor, an image in response to receiving an activation input;
displaying, by the object animation software code executed by the hardware processor, the image on the display;
receiving, by the object animation software code executed by the hardware processor, a selection input selecting an object shown in the image;
determining, by the object animation software code executed by the hardware processor, a distance separating the selected object from the portable device;
receiving, by the object animation software code executed by the hardware processor, a first animation input including a physical movement of the portable device;
identifying, by the object animation software code executed by the hardware processor, and based on the selected object and in response to the first animation input, a movement for animating the selected object;
generating, by the object animation software code executed by the hardware processor, an animation of the selected object using the determined distance and the identified movement, wherein the animation moves the selected object as if the selected object is connected to the portable device and maintains the determined distance separating the selected object from the portable device as a fixed distance; and
rendering, by the object animation software code executed by the hardware processor, the animation of the selected object.

11. The method of claim 10, wherein the portable device further comprises a motion sensor, and wherein the first animation input is received from the motion sensor.

12. The method of claim 10, wherein the portable device further comprises a microphone, and wherein a second animation input for animating the selected object is a voice input to the microphone.

13. The method of claim 10, wherein the display comprises a touchscreen of the portable device, and wherein a second animation input for animating the selected object is one of a touch or a gesture applied to the touchscreen.

14. The method of claim 10, wherein rendering the animation of the selected object comprises rendering the animation on the display.

15. The method of claim 10, wherein the virtual puppeteering system further comprises a projection device communicatively coupled to the portable device, and wherein rendering the animation of the selected object comprises projecting the animation onto a surface in a real-world environment using the projection device.

16. The method of claim 10, further comprising:
receiving, by the object animation software code executed by the hardware processor, another selection input selecting a virtual environment for the animation of the selected object;
wherein identifying the at least one movement for animating the selected object is based further on the selected virtual environment; and
wherein generating the animation of the selected object further uses the selected virtual environment.

17. The method of claim 10, wherein the selected object is a real-world object, and wherein the identified movement for animating the selected object is one of walking, running, crouching, or jumping.

18. A method for use by a virtual puppeteering system including a portable device having a camera, a display, a hardware processor, and a system memory storing an object animation software code, the method comprising:
generating, using the camera by the object animation software code executed by the hardware processor, an image in response to receiving an activation input;
displaying, by the object animation software code executed by the hardware processor, the image on the display;
receiving, by the object animation software code executed by the hardware processor, a selection input selecting an object shown in the image;
determining, by the object animation software code executed by the hardware processor, a distance separating the selected object from the portable device;
receiving, by the object animation software code executed by the hardware processor, a first animation input including a physical movement of the portable device;
identifying, by the object animation software code executed by the hardware processor, and based on the selected object and in response to the first animation input, a movement for animating the selected object;
generating, by the object animation software code executed by the hardware processor, an animation of the selected object using the determined distance and the identified movement, wherein the animation moves the selected object as if the selected object is connected to the portable device by a rigid rod of length equal to the determined distance; and rendering, by the object animation software code executed by the hardware processor, the animation of the selected object.

* * * * *